O. A. GRUBB.
POWER TRANSMITTING MECHANISM.
APPLICATION FILED APR. 22, 1918.
1,296,654.
Patented Mar. 11, 1919.
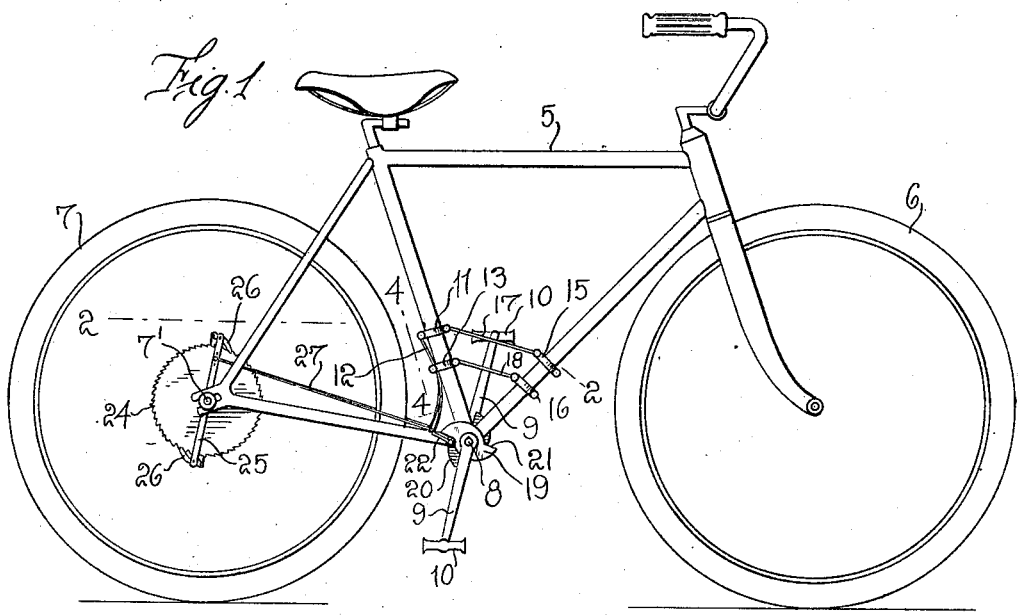
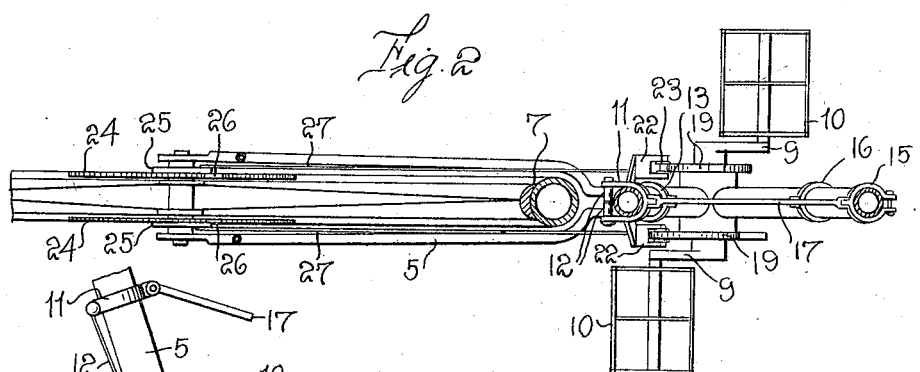
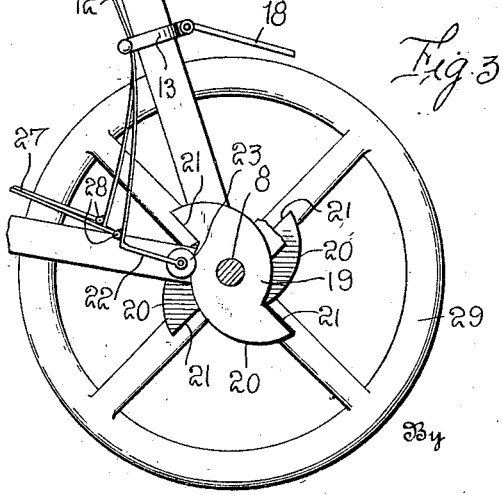
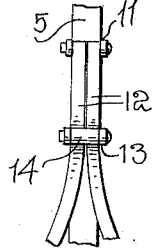
Inventor
Orin A. Grubb.
By Watson E. Coleman
Attorney

UNITED STATES PATENT OFFICE.

ORIN A. GRUBB, OF WICHITA FALLS, TEXAS.

POWER-TRANSMITTING MECHANISM.

1,296,654.

Specification of Letters Patent. Patented Mar. 11, 1919.

Application filed April 22, 1918. Serial No. 230,083.

*To all whom it may concern:*

Be it known that I, ORIN A. GRUBB, a citizen of the United States, residing at Wichita Falls, in the county of Wichita and State of Texas, have invented certain new and useful Improvements in Power-Transmitting Mechanisms, of which the following is a specification, reference being had to the accompanying drawings.

This invention relates to an improved power transmitting mechanism, and has for its primary object to provide simple and effective means primarily designed for use in driving bicycles, motor cycles and similar vehicles whereby rotation is transmitted to the driven wheel without the use of chains, belts, gears or analogous elements commonly employed for this purpose.

It is also an additional object of my invention to provide a mechanism for the above purpose whereby a maximum of driving power is transmitted with a minimum expenditure of energy, and at substantially a uniform speed.

It is a more particular object of the invention to provide a propelling or driving mechanism for bicycles and similar vehicles embodying a sprocket or ratchet wheel fixed upon the driven shaft and relatively movable pawls to coact with the teeth of the ratchet at diametrically opposite points to rotate the same in one direction, means for actuating the ratchet pawls including a yieldable element fulcrumed on the vehicle frame and operatively connected to the pawls, and a cam secured to the pedal shaft and coacting with the yieldable element.

It is a further general object of my invention to provide a power transmitting mechanism as above characterized, the several parts of which are of very simple construction and not liable to get out of order, efficient and reliable in their operation, and capable of manufacture at relatively small cost.

With the above and other objects in view, the invention consists in the improved construction, combination and relative arrangement of the several parts as will be hereinafter more fully described, subsequently claimed and illustrated in the accompanying drawings in which similar reference characters designate corresponding parts throughout the several views, and wherein:

Figure 1 is a side elevation illustrating one embodiment of my invention operatively applied to a bicycle;

Fig. 2 is a horizontal sectional view taken on the line 2—2 of Fig. 1;

Fig. 3 is an enlarged detail elevation illustrating the action of the cam members upon the spring levers; and Fig. 4 is a vertical section taken on the line 4—4 of Fig. 1.

Referring in detail to the drawing, wherein I have illustrated my improved transmission mechanism applied to a bicycle, 5 designates the bicycle frame, which may be of any ordinary or approved construction, 6 the front wheel of the bicycle, and 7 the rear driven wheel thereof. 8 designates the crank shaft or axle having an arm 9 fixed at each end thereof, equipped with the usual foot pedal 10.

Upon the bar of the frame 5, which extends upwardly in a rearward direction from the crank axle 8, a clamping band or collar 11 is engaged, and to this band, a pair of spring levers 12 are pivotally connected at one of their ends. A second band 13 is adjustably clamped upon the frame bar in spaced relation to the band 11, and said band 13 carries a fulcrum pin or roller 14. The spring levers 12 extend between the roller 14 and the bar of the frame 5. In order to more securely retain the bands 11 and 13 against relative movement on the frame bar, I provide the additional bands or rings 15 and 16 respectively, which are adjustably clamped or otherwise secured upon the forwardly and upwardly extending bar of the frame 5. These latter bands or collars are connected to the bands 11 and 13 by the rods 17 and 18 respectively.

Upon the ends of the crank axle 8, at each side of the machine frame, a cam member 19 is suitably secured, each of the cam members having oppositely projecting cam segments 20, which terminate at one of their ends in the radially extending faces 21. These radial faces on one cam member are disposed at right angles to the radial plane of the faces 21 of the other cam member. The lower end of each spring lever 12 is formed with, or has secured thereto, an angularly disposed arm 22 in the end of which an anti-friction roller indicated at 23 is suitably mounted. This roller is engaged upon the periphery of one of the cam members, and is preferably flanged at its ends as illustrated so as to prevent the transverse displacement of the roller from the face of the cam.

To the hub of the rear driven wheel 7 the spaced ratchet wheels 24 are fixed, and upon the wheel axle 7', a pair of levers 25 are loosely engaged intermediate of their ends, said levers being respectively disposed adjacent to the outer side faces of the respective ratchet wheels. Upon the ends of each lever 25, oppositely extending spring pressed pawls or dogs 26 are mounted, said pawls being normally urged into yielding engagement with the teeth of the ratchet 24. To each of the levers 25 adjacent its upper end, one end of a rod 27 is pivotally connected. The other end of the rod is pivotally connected as at 28 to the lower end of one of the spring levers 12 at the juncture of the angular arm 22 with said lever.

When the invention is used in connection with motor cycles or other relatively heavy vehicles or machines, I preferably provide a balance or fly wheel 29 secured upon the crank axle 8 as shown in Fig. 3 to increase the momentum and add to the ease of operation of the mechanism.

In the operation of the device, it will be understood that in each rotation of the crank axle 8, the sectors 20 of the respective cam members 19 coacting with one of the levers 12, urges the arm 22 of the lever outwardly or radially with respect to the axle, and shifts the upper end of the lever 25 connected to the spring lever by the rod 27 in a rearward direction, the pawls 26 moving idly on the teeth of the ratchet. When the arm 22 moves off of the peripheral face of the cam sector, said arm is urged inwardly by the tension of the spring lever over the end face 21 of the cam sector to the inner side of the cam. This action occurs very quickly and suddenly, owing to the high tensional pull of the spring lever. The movement of the lever 25 is thus reversed, the upper end moving forwardly and the lower end rearwardly. In this movement the pawls 26 are locked with the teeth of the ratchet 24 so that rotation is transmitted to the driven wheel 7. Subsequently the other of said levers 25 is operated in a similar manner by one of the sectors of the other cam 19. It will be understood that each cam operates to cause two such operations of the respective levers 25 in each complete rotation of the crank axle, said operations taking place at relatively different times. Thus, a positive rotative power is transmitted to the driven wheel of the vehicle four times in each revolution of the crank shaft. In this manner, I obtain a maximum of driving power with a minimum expenditure of energy, and with relatively slight variation in speed. In the use of my invention upon bicycles and other relatively light vehicles, a powerful driving speed may be transmitted to the driven wheel of the vehicle, without necessitating the use of the balance wheel above referred to. However, as I contemplate the use of the invention in connection with numerous other machines employed for various purposes, in some instances this balance wheel may be found desirable.

From the above description taken in connection with the accompanying drawing, the construction, manner of operation and several advantages of my invention will be clearly and fully understood. The several parts employed are of exceedingly simple form, strong and durable in their construction and not liable to get out of order. While I have herein illustrated a particular form of the operating cams, it is apparent that they are capable of certain variations as to size, shape and form without materially affecting the results obtained.

I have also herein shown and described the preferred construction and arrangement of the several other elements employed, but it is to be understood that the parts likewise are susceptible of considerable modification in the adaptation of the device to different uses. I therefore reserve the privilege of adopting all such legitimate changes as may be fairly embodied within the spirit and scope of the invention as claimed.

I claim:—

1. In a power transmission mechanism, in combination with a driving shaft and a driven wheel, a ratchet wheel fixed to the driven wheel, a spring lever, a cam element fixed upon the driving shaft and constantly engaged with the free end of said lever, means operatively engaged with the teeth of the ratchet to positively rotate the driven wheel in one direction, and means operatively connecting the last named means to said spring lever.

2. In a power transmission mechanism, in combination with a driving axle and a driven wheel, a spring lever, an adjustable fulcrum for said lever, a cam element fixed upon the driving shaft and constantly engaged with the free end of said lever to move said lever with respect to the fulcrum and then suddenly release the lever for movement in and opposite direction, and means connected to said lever and operated in the latter movement thereof to transmit rotation to the driven wheel.

3. In a power transmission mechanism, in combination with a driving shaft and a driven wheel, a ratchet fixed to the driven wheel, a relatively movable lever, a pawl coacting with the teeth of the ratchet in the movement of the lever in one direction to rotate the driven wheel, a cam member fixed upon the driving shaft, a spring lever having an angular arm at all times operatively engaged with the periphery of the cam member whereby the lever is moved in one direction in the rotation of the cam and placed under tension, and then suddenly released for movement in an opposite direction, and means operatively connecting the spring lever to the ratchet lever.

4. In a power transmission mechanism, in combination with a driving shaft and a driven wheel, a ratchet fixed to the driven wheel, a relatively movable lever, a pawl coacting with the teeth of the ratchet in the movement of the lever in one direction to rotate the driven wheel, a cam member fixed upon the driving shaft, a spring lever having an angular arm operatively engaged with the periphery of the cam member whereby the lever is moved in one direction in the rotation of the cam and placed under tension, and then suddenly released for movement in an opposite direction, said spring lever being pivotally mounted at one of its ends, an adjustable fulcrum engaged by the lever at a point intermediate of its ends, and means operatively connecting the spring lever to the ratchet lever.

5. In a driving mechanism for bicycles and the like, in combination with a driving shaft and a driven wheel, a pair of ratchets fixed to the driven wheel, pawls coacting with the respective ratchets to rotate the driven wheel in one direction, members fixed upon the driving shaft and having radially projecting cam portions, the cam portions of the respective members extending at right angles to each other, a pair of spring levers coacting at their free ends with the respective cam members, and means operatively connecting said levers to the respective ratchet pawls.

6. In a driving mechanism for bicycles and the like, in combination with a driving shaft and a driven wheel, a pair of ratchets fixed to the driven wheel, pawls coacting with the respective ratchets to rotate the driven wheel in one direction, members fixed upon the driving shaft and having radially projecting cam portions, the cam portions of the respective members extending at right angles to each other, a pair of spring levers coacting at their free ends with the respective cam members, a common adjustable fulcrum for the spring levers mounted upon the vehicle frame, and means operatively connecting said levers to the respective ratchet pawls.

7. In a driving mechanism for bicycles and the like, in combination with a driving shaft and a driven wheel, a pair of ratchets fixed to the driven wheel, pawls coacting with the respective ratchets to rotate the driven wheel in one direction, members fixed upon the driving shaft and having radially projecting cam portions, the cam portions of the respective members extending at right angles to each other, a pair of spring levers coacting at their free ends with the respective cam members, a collar engaged upon the vehicle frame to which the spring levers are pivotally connected at their other ends, a common adjustable fulcrum engaging the levers intermediate of their ends, and means mounted upon the frame and connected to said collar and fulcrum to prevent relative shifting movement of said collar and fulcrum.

8. In a power transmission mechanism, in combination with a driving shaft and a driven wheel, a ratchet fixed to the driven wheel, a relatively movable lever, a pawl carried by the lever and coacting with the ratchet in the movement of the lever in one direction to rotate the driven wheel, a spring lever pivotally mounted at one of its ends, an actuating element fixed to the driving shaft and constantly engaged with the other end of said spring lever, and an operative connection between the latter end of the spring lever and said first named lever.

9. In a power transmission mechanism, in combination with a driving shaft and a driven wheel, a ratchet fixed to the driven wheel, a relatively movable lever, a pawl carried by the lever and coacting with the ratchet in the movement of the lever in one direction to rotate the driven wheel, a spring lever pivotally mounted at one of its ends, an actuating element fixed to the driving shaft and constantly engaged with the other end of said spring lever, an operative connection between the latter end of the spring lever and said first named lever, and a fulcrum member adjustable relative to the spring lever and coacting with said lever intermediate of its ends.

10. In a driving mechanism for bicycles and the like, in combination with a driving shaft and a driven wheel, a pair of ratchets fixed to the driven wheel, pawls coacting with the respective ratchets to rotate the driven wheel in one direction, a pair of spring levers, a common pivot mounting for the levers at one of their ends, an operative connection between the other end of said levers and the respective ratchets, and actuating elements fixed upon the driving shaft and coacting with the free ends of the respective levers.

11. In a driving mechanism for bicycles and the like, in combination with a driving shaft and a driven wheel, a pair of ratchets fixed to the driven wheel, pawls coacting with the respective ratchets to rotate the driven wheel in one direction, a pair of spring levers, a common pivot mounting for the levers at one of their ends, an operative connection between the other end of said levers and the respective ratchets, adjustable fulcrum means for the levers mounted upon the vehicle frame and shiftable relative to the pivoted ends of said levers, and actuating elements fixed upon the driving shaft and coacting with the free ends of the respective levers.

In testimony whereof I hereunto affix my signature in the presence of two witnesses.

ORIN A. GRUBB.

Witnesses:
MARY FOSTER,
MINNIE POE.